(12) United States Patent
Hara

(10) Patent No.: US 10,694,881 B2
(45) Date of Patent: Jun. 30, 2020

(54) CONSUMER HEATING COOKER WITH PICTURES NOTIFYING PIVOTABLE STIRRING BLADES STIRRING AND NON-STIRRING STATE

(71) Applicant: SHARP KABUSHIKI KAISHA, Osaka-shi, Osaka (JP)

(72) Inventor: Keisuke Hara, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 1255 days.

(21) Appl. No.: 14/378,815

(22) PCT Filed: Feb. 14, 2013

(86) PCT No.: PCT/JP2013/053548
§ 371 (c)(1),
(2) Date: Aug. 14, 2014

(87) PCT Pub. No.: WO2013/122153
PCT Pub. Date: Aug. 22, 2013

(65) Prior Publication Data
US 2015/0020694 A1  Jan. 22, 2015

(30) Foreign Application Priority Data

Feb. 15, 2012 (JP) .................................. 2012-030691

(51) Int. Cl.
*A47J 27/00* (2006.01)

(52) U.S. Cl.
CPC ............ *A47J 27/002* (2013.01); *A47J 27/004* (2013.01)

(58) Field of Classification Search
CPC ........................................................ A47J 27/00
(Continued)

(56) References Cited

U.S. PATENT DOCUMENTS

| | | | | |
|---|---|---|---|---|
| 5,937,740 A | * | 8/1999 | Kubota | ................. A21B 7/005 219/401 |
| 2002/0005401 A1 | * | 1/2002 | Meyer | .................... F24C 14/02 219/413 |

(Continued)

FOREIGN PATENT DOCUMENTS

| | | |
|---|---|---|
| JP | 07-289424 A | 11/1995 |
| JP | 07289424 A * | 11/1995 |

*Primary Examiner* — Ibrahime A Abraham
*Assistant Examiner* — Spencer H. Kirkwood
(74) *Attorney, Agent, or Firm* — Birch, Stewart, Kolasch & Birch, LLP

(57) ABSTRACT

A heating cooker includes an inner pot (7) for accommodating therein a heating object to be heated, a heating cooker body (1) for accommodating the inner pot (7) therein, a heating part (10) attached to the heating cooker body (1) and serving for heating the heating object, a lid (2) which is openably/closably attached on top of the heating cooker body (1) and which can be closed so as to cover the inner pot (7), a rotator (11) rotatably placed between the heating cooker body (1) and the lid (2), stirrers (12A, 12B) which are attached to the rotator (11) and which are switchable between a stirring state of being in contact with the heating object set in the inner pot (7) and a non-stirring state of being apart from the heating object set in the inner pot (7), and a notification part (5) for notifying which the stirrers (12A, 12B) are in the stirring state or in the non-stirring state while the lid (2) is closed.

9 Claims, 13 Drawing Sheets

(58) Field of Classification Search
USPC .......................................................... 99/342
See application file for complete search history.

(56) References Cited

U.S. PATENT DOCUMENTS

2009/0164933 A1\* 6/2009 Pederson ............. G05B 19/409
                                                                           715/772
2013/0204406 A1\* 8/2013 Andersson ............. G05B 19/02
                                                                           700/83

\* cited by examiner

CONSUMER HEATING COOKER WITH PICTURES NOTIFYING PIVOTABLE STIRRING BLADES STIRRING AND NON-STIRRING STATE

TECHNICAL FIELD

The present invention relates to a heating cooker having a stirring function.

BACKGROUND ART

Conventionally, there has been a rice cooker, as an example of heating cookers, which includes a rice cooker body for accommodating an inner pot, an openable/closable lid attached on top of the rice cooker body, and a stirrer provided at a portion of the lid facing the inner pot and serving for stirring rice grains in the inner pot (see JP H7-289424 A (PTL1)). The stirrer, which is accommodated in the lid in a folded state, is opened for stirring the rice grains in the inner pot. Upon an end of the stirring of rice grains in the inner pot, the stirrer is folded and accommodated in the lid.

CITATION LIST

Patent Literature

PTL1: JP H7-289424 A

SUMMARY OF INVENTION

Technical Problem

With the conventional rice cooker described above, while the lid is closed, the user cannot discriminate whether or not the stirrer is folded in the lid. As a result of this, problematically, opening the lid by the user with the stirrer unfolded may cause the stirrer to involve up rice grains in the inner pot, or the opening action of the lid may be obstructed by the stirrer.

Also, with the lid closed, even when the user wants to open the lid after an end of the stirring by the stirrer, the user is inhibited from ascertaining the stirring action of the stirrer, thus being unable to grasp a time zone in which the lid may freely be opened, as another problem.

Accordingly, an object of the present invention is to provide a heating cooker which can reduce the possibility that the stirrer may involve up a heating object set in the inner pot or the opening action of the lid may be obstructed by the stirrer and which makes it possible to grasp the time zone in which the lid may be opened.

Solution to Problem

In order to solve the problem, a heating cooker according to the present invention comprises:
an inner pot for accommodating therein a heating object to be heated;
a heating cooker body for accommodating the inner pot therein;
a heating part attached to the heating cooker body and serving for heating the heating object;
a lid which is openably/closably attached on top of the heating cooker body and which can be closed so as to cover the inner pot;
a rotator rotatably placed between the heating cooker body and the lid;
stirrers which are attached to the rotator and which can be switched between a stirring state of being in contact with the heating object set in the inner pot and a non-stirring state of being apart from the heating object set in the inner pot; and
a notification part for notifying as to whether the stirrers are in the stirring state or in the non-stirring state with the lid closed.

In this heating cooker, since the notification part notifies the stirring state or the non-stirring state of the stirrers while the lid is closed, the user can discriminate whether the stirrers are in the non-stirring state or in the stirring state, even without opening the lid. Therefore, the user can be dissuaded from opening the lid while the stirrers are in the stirring state. As a result, it is possible to reduce the possibility that the stirrers may involve up the heating object in the inner pot or the opening action of the lid may be obstructed by the stirrers.

Also, for opening the lid after an end of stirring by the stirrers, since the user can discriminate whether the stirrers are in the stirring state or in the non-stirring state, even without opening the lid, the user is enabled to grasp a time zone in which the lid may freely be opened.

In one embodiment of the heating cooker,
the notification part is a display part for visually performing notification as to the stirrers.

According to this embodiment, on condition that notification as to the stirrers is implemented in an auditory manner, the notification can be inaudible due to ambient noise. In contrast to this, with the notification as to the stirrers implemented in a visual manner by the display part, the user can securely discriminate the state of the stirrers even with ambient noise involved.

In one embodiment of the heating cooker,
the display part displays rice boiling steps associated with the stirring state and the non-stirring state.

According to this embodiment, since the rice boiling steps associated with the stirring state and the non-stirring state are displayed in the display part, the user is enabled to confirm in which step the rice cooking is currently.

An embodiment of the heating cooker further comprises:
a lock mechanism for locking the lid, wherein
the display part displays whether or not the lock mechanism is locking the lid.

According to this embodiment, since whether or not the lock mechanism is locking the lid is displayed in the display part, the user can be kept from opening the lid when the lock mechanism is not locking the lid with the stirrers in the stirring state.

In one embodiment of the heating cooker,
the display part displays a state in which the rotator is rotating.

According to this embodiment, when the lid is opened with the rotator rotating, there is a fear that the rotator may hit against some other thing so as to be damaged. Therefore, since the the state that the rotator is rotating is displayed by the display part, the user can be dissuaded from opening the lid when there is a fear for damage to the rotator.

Advantageous Effects of Invention

According to the heating cooker of the invention, the heating cooker includes a rotator rotatably placed between the heating cooker body and the lid, and stirrers which are attached to the rotator and which can be switched between a stirring state of being in contact with the heating object set in the inner pot and a non-stirring state of being apart from the heating object set in the inner pot, and a notification part for notifying as to whether the stirrers are in the stirring state or in the non-stirring state with the lid closed. Thus, since the stirring state or the non-stirring state of the stirrers is notified by the notification part while the lid is closed, the user is enabled to discriminate whether the stirrers are in the stirring state or in the non-stirring state, even without opening the lid. Therefore, the user can be dissuaded from opening the lid when the stirrers are in the stirring state. As a result, it is possible to reduce the possibility that the stirrers may involve up the heating object set in the inner pot or the opening action of the lid may be obstructed by the stirrers.

Also, for opening the lid after an end of stirring by the stirrers, since the user can discriminate which the stirrers are in the stirring state or in the non-stirring state, even without opening the lid, the user is enabled to grasp a time zone in which the lid may freely be opened.

DESCRIPTION OF EMBODIMENTS

Hereinbelow, the heating cooker of the present invention will be described in detail by embodiments thereof illustrated in the accompanying drawings.

Figure 1:
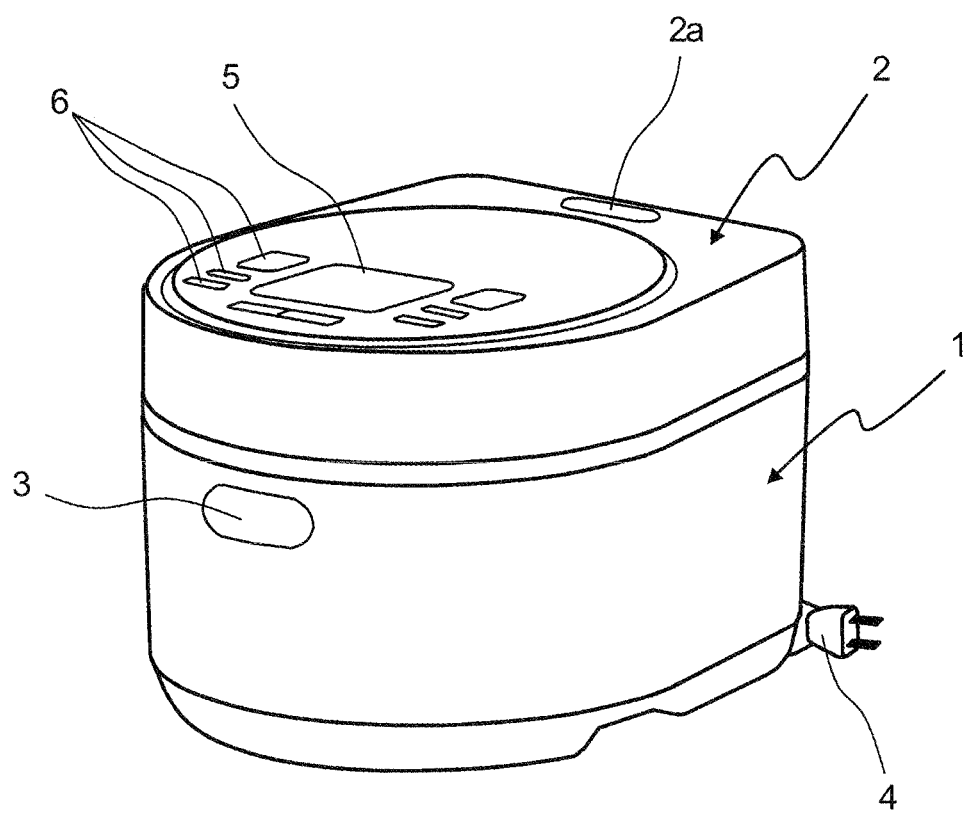
FIG. 1 is a schematic perspective view of a rice cooker according to one embodiment of the invention, with its lid closed.

FIG. 1 is a schematic perspective view of a rice cooker according to one embodiment of the invention, as viewed obliquely from upward.

The rice cooker includes a rice cooker body 1 as an example of a heating cooker body, and a lid 2 openably/closably attached to the rice cooker body 1.

An opening button 3 for opening the lid 2 is provided on a front of the rice cooker body 1. On the other hand, a leading end portion of a power cord 4 leads out from a rear face of the rice cooker body 1. Most part of the power cord 4 is withdrawably wound on a cord reel (not shown) in the rice cooker body 1.

An LCD part 5 for displaying boiling menus, cooking names and the like, as well as a plurality of operation buttons 6, 6, . . . are provided in a front portion of the top face of the lid 2. Steam of the inner pot 7 (see FIG. 2) is discharged through a steam discharge port 2a provided at a rear portion in the top face of the lid 2. In addition, the LCD part 5 is an example of the display part.

Figure 2:
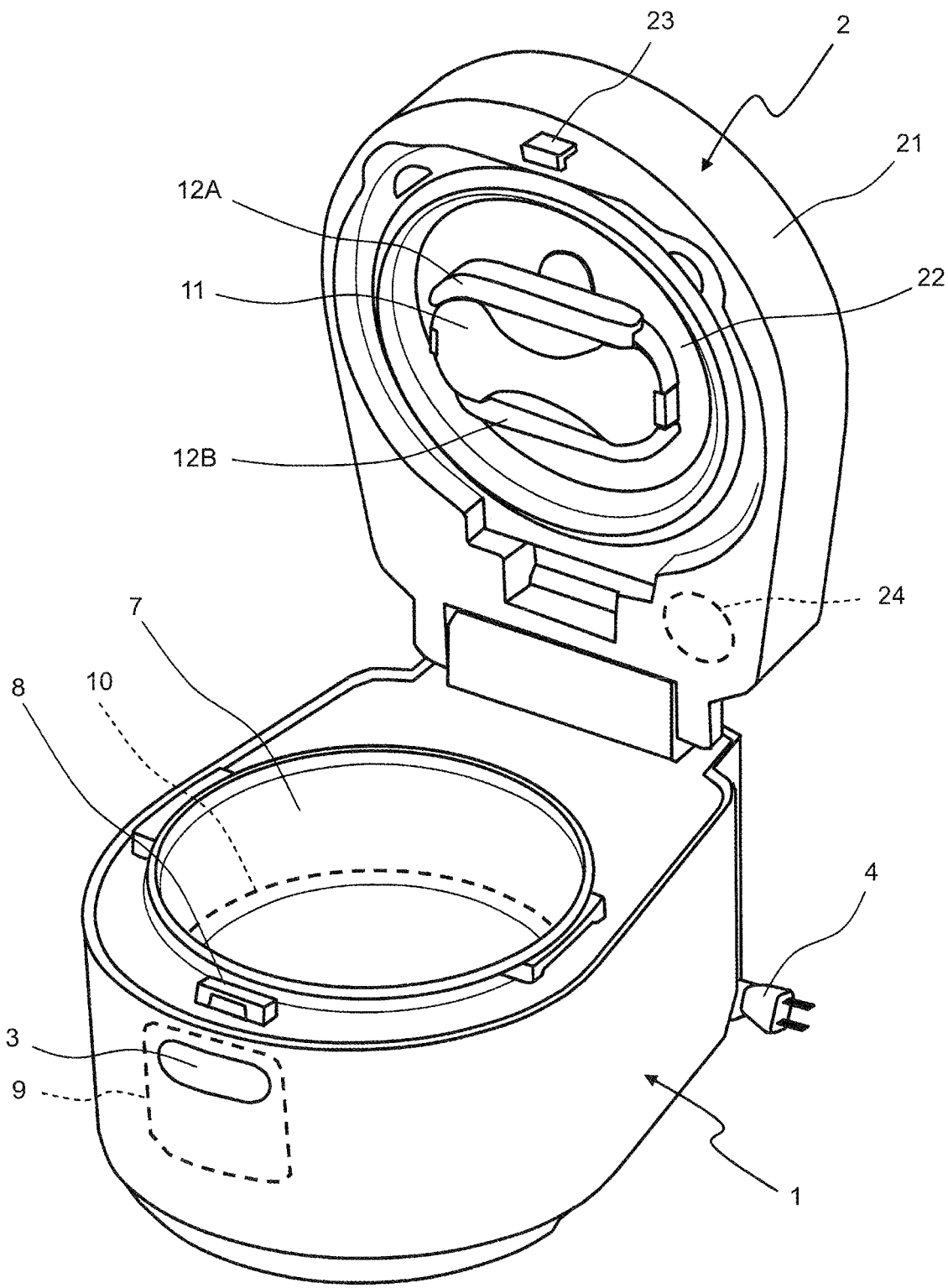
FIG. 2 is a schematic perspective view of the rice cooker with its lid opened.

FIG. 2 is a schematic perspective view of the rice cooker with its lid 2 opened.

The inner pot 7 is accommodated in the rice cooker body 1, and rice, water and the like as an example of the heating object are to be set into the inner pot 7. Also, an engaged portion 8 is provided at a front portion in the top of the rice cooker body 1. This engaged portion 8 is to be releasably engaged with an engaging portion 23 provided at a front portion in the bottom of the lid 2. Also, a lock mechanism 9 for locking the lid 2 is provided in the rice cooker body 1. While the lock mechanism 9 is not locking the lid 2, pressing the opening button 3 causes the engaged portion 8 to be moved rearward so that engagement of the engaging portion 23 with the engaged portion 8 is released. Conversely, while the lock mechanism 9 is locking the lid 2, even pressing the opening button 3 does not cause the engaged portion 8 to be moved rearward, so that the engagement of the engaging portion 23 with the engaged portion 8 is not released. Furthermore, an induction heating coil 10 for inductively heating the inner pot 7 is placed in the rice cooker body 1. It is noted that the induction heating coil 10 is an example of the heating part.

The inner pot 7 is formed from a high thermal conductivity member such as aluminum. Stainless or other magnetic material for enhancing the heating efficiency is attached on an outer surface of the inner pot 7, while its inner surface is coated with fluororesin for preventing adhesion of the heating object.

The lid 2 has an outer lid 21 which is positioned on one side opposite to the inner pot 7 side in the closed state of the lid 2, and an inner lid 22 which is positioned on the inner pot 7 side in the closed state of the lid 2. A drive motor 24 is installed at a right-side corner portion in the rear of the outer lid 21. Also, a coupling shaft (not shown) is rotatably installed at a central portion of the outer lid 21. This coupling shaft is rotated upon reception of rotation driving force generated by the drive motor 24 via a pulley (not shown) or a belt (not shown).

Further, a rotator 11 is rotatably placed between the rice cooker body 1 and the lid 2. The rotator 11 is removably attached to the lid 2. More specifically, one end of a rotating shaft 15 projects from a portion of the rotator 11 on one side closer to the lid 2 (see FIG. 4). As one end portion of the rotating shaft 15 is removably coupled with the coupling shaft of the outer lid 21, the rotating shaft 15 is rotated integrally with the above-described coupling shaft. The rotating shaft 15 is also rotatable relative to the rotator 11.

First, second stirrer arms 12A, 12B are attached to the rotator 11. These first, second stirrer arms 12A, 12B, which are radially adjacent to the rotator 11, are each switchable between a stirring state of being in contact with rice or the like in the inner pot 7 and a non-stirring state of being apart from the rice or the like in the inner pot 7. That is, each of the first, second stirrer arms 12A, 12B has one end portion pivotably attached to the rotator 11 and the other end portion allowed to go apart from or closer to the rotator 11. It is noted that the first, second stirrer arms 12A, 12B are an example of the stirrer.

Figure 3:
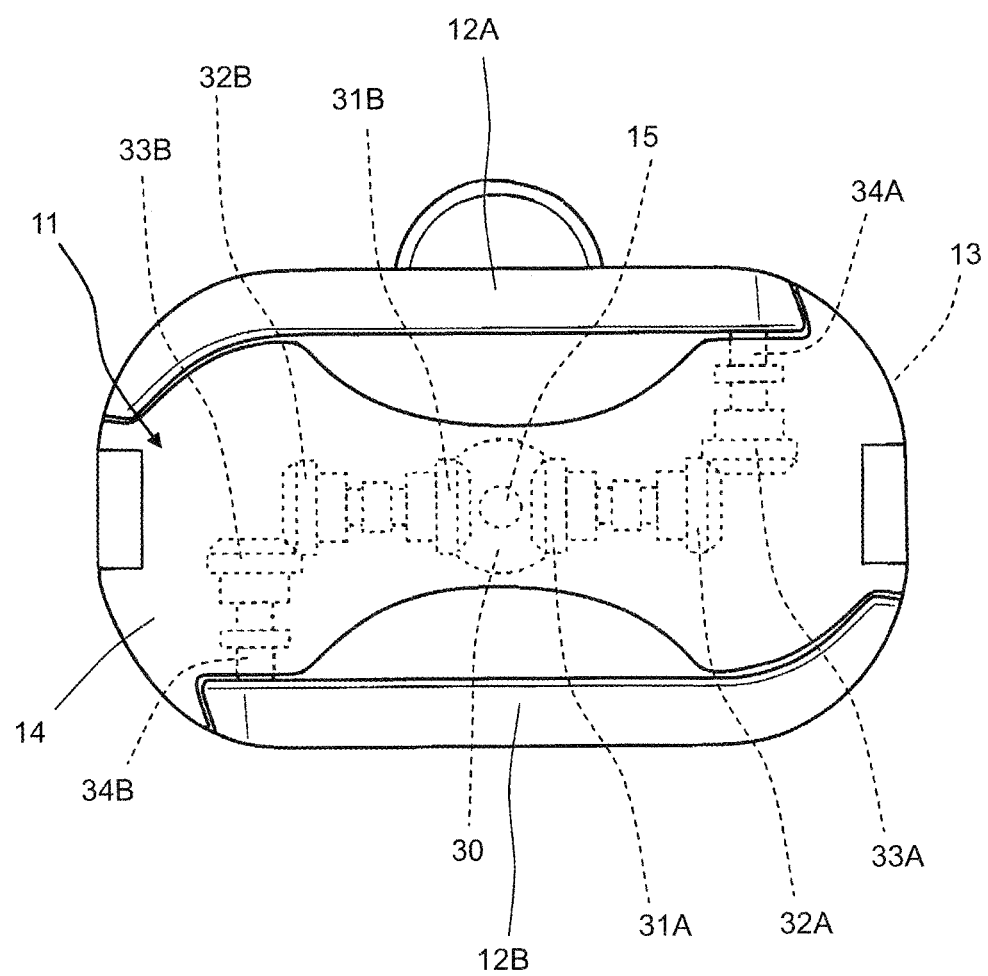
FIG. 3 is a schematic bottom view of a rotator of the rice cooker.

FIG. 3 is a schematic view as the rotator 11 is viewed from the inner pot 7 side.

The rotator 11 has a lid-side member 13, and an inner pot-side member 14 removably attached to the inner pot 7-side surface of the lid-side member 13. Placed between the lid-side member 13 and the inner pot-side member 14 are a both first-and-second stirrer arms-dedicated bevel gear 30, first stirrer arm-dedicated gears 31A, 32A, 33A, and second stirrer arm-dedicated gears 31B, 32B, 33B. Rotational drive of the rotating shaft 15 is transmitted to a first stirrer arm-dedicated pivoting shaft 34A via the both first-and-second stirrer arms-dedicated bevel gear 30 and the first stirrer arm-dedicated gears 31A, 32A, 33A and moreover transmitted to a second stirrer arm-dedicated pivoting shaft 34B via the both first-and-second stirrer arms-dedicated bevel gear 30 and the second stirrer arm-dedicated gears 31B, 32B, 33B. As a result of this, as the rotating shaft 15 is rotated, the first, second stirrer arms 12A, 12B are pivoted about the first-and-second stirrer arms-dedicated pivoting shafts 34A, 34B, thus making it possible to switch from the non-stirring state shown in FIGS. 2 and 3 to the stirring state shown in FIG. 4 or switch from the stirring state to the non-stirring state.

Figure 4:
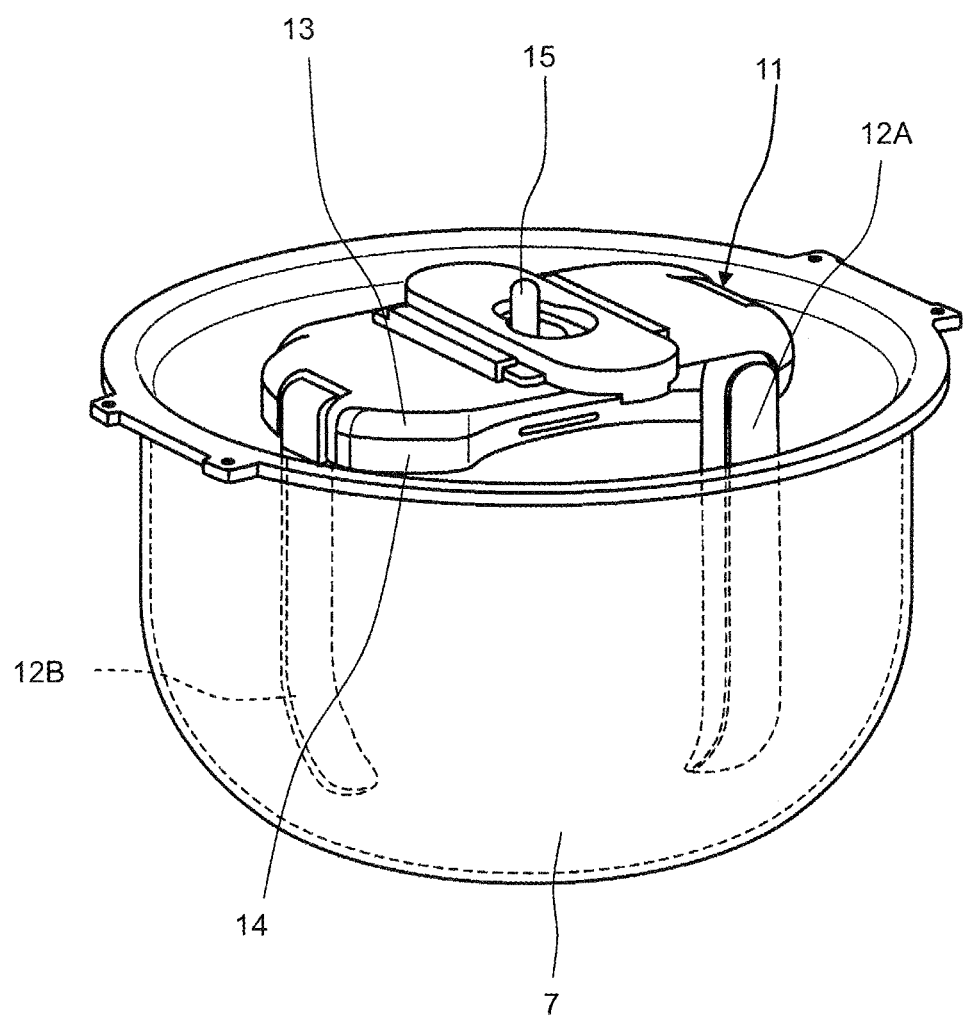
FIG. 4 is a schematic perspective view for explaining a stirring state of first, second stirrer arms.

It is noted that in FIG. 4, the rice cooker body 1 and the lid 2 are omitted in depiction so that the first, second stirrer arms 12A, 12B can be discerned.

Figure 5:
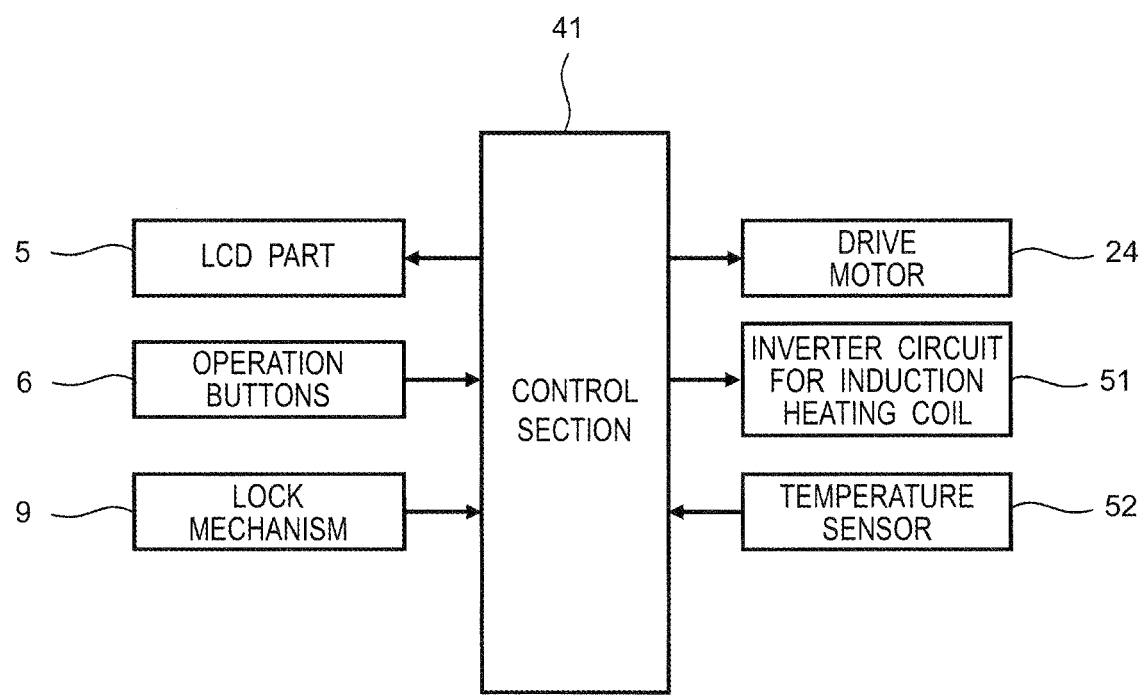
FIG. 5 is a control block diagram of the rice cooker.

FIG. 5 is a control block diagram of the rice cooker. In FIG. 5, only main component parts are shown and the other parts are omitted.

The rice cooker includes a control section 41 composed of a microcomputer, input/output circuits and the like. The control section 41 controls the LCD part 5, the drive motor 24, an induction heating coil-dedicated inverter circuit 51 and the like based on signals from the operation buttons 6, 6, . . . , the lock mechanism 9 and the temperature sensor 52. The induction heating coil-dedicated inverter circuit 51 is installed in the rice cooker body 1 to have the induction heating coil 10 generate an alternating magnetic field. Also, the temperature sensor 52 is installed in the rice cooker body 1 to deliver a signal indicative of a temperature of the inner pot 7 to the control section 41.

Figure 6:
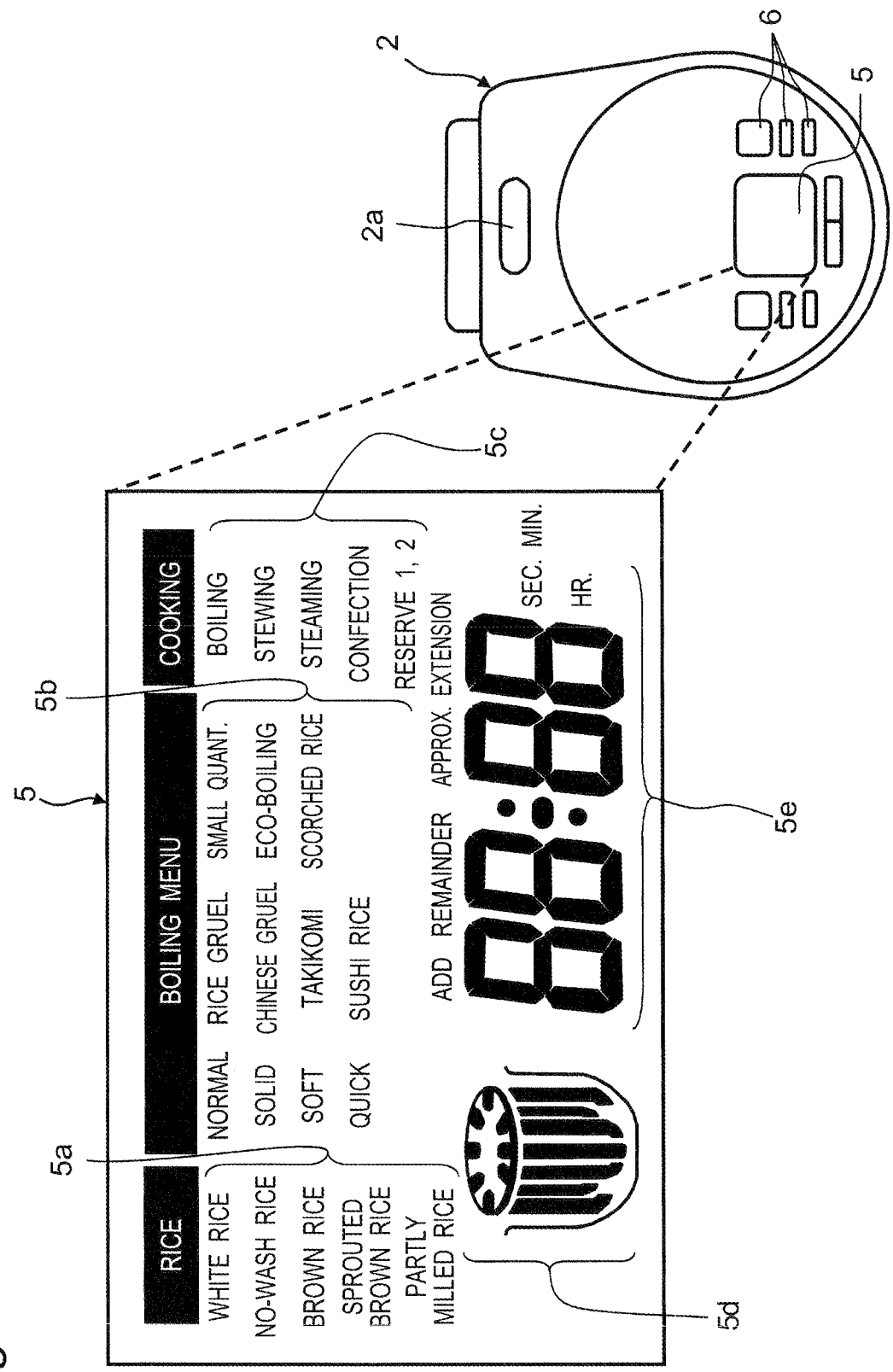
FIG. 6 is a schematic top view of the rice cooker.
Figure 7:
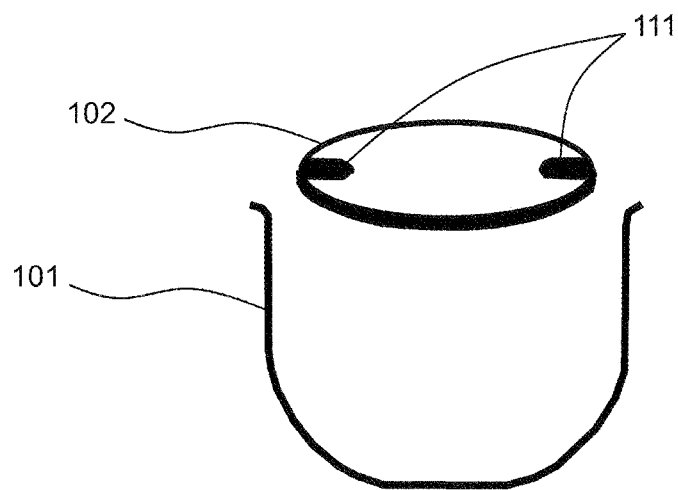
FIG. 7 is a view of a display by an interior-state display area.
Figure 8:
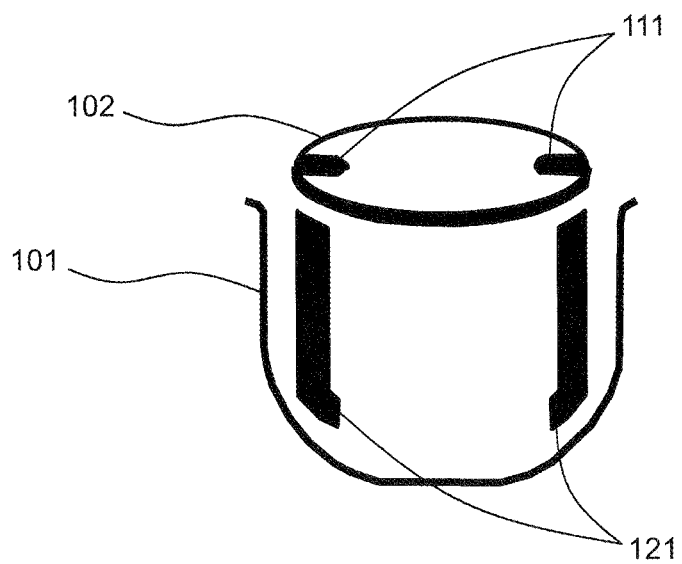
FIG. 8 is a view of another display by the interior-state display area.
Figure 9:
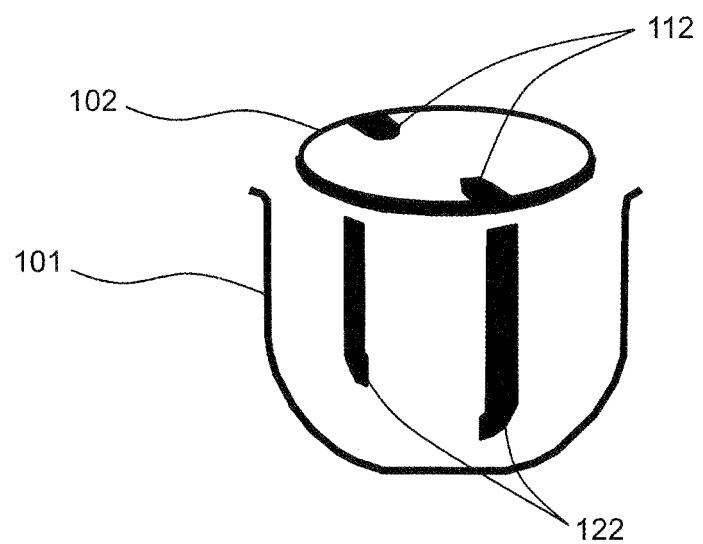
FIG. 9 is a view of another display by the interior-state display area.
Figure 10:
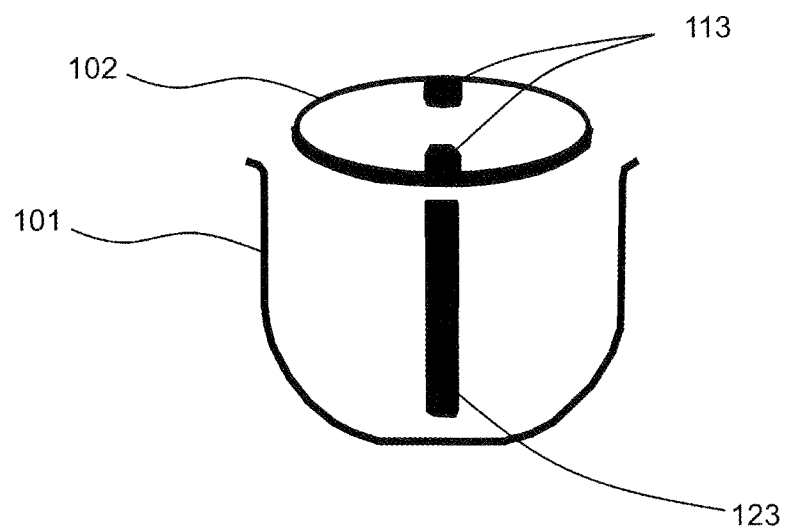
FIG. 10 is a view of another display by the interior-state display area.
Figure 11:
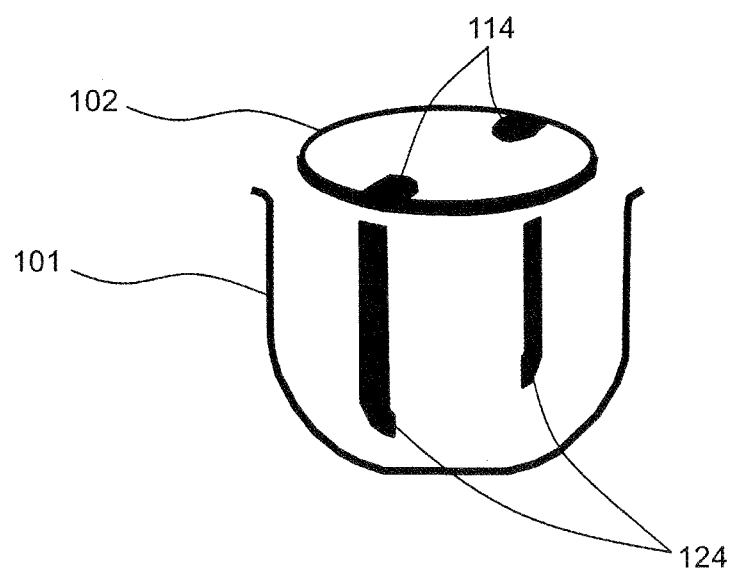
FIG. 11 is a view of another display by the interior-state display area.
Figure 12:
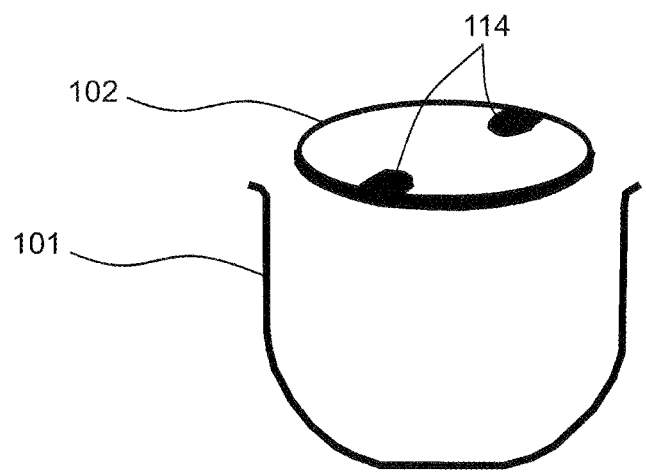
FIG. 12 is a view of another display by the interior-state display area.
Figure 13:
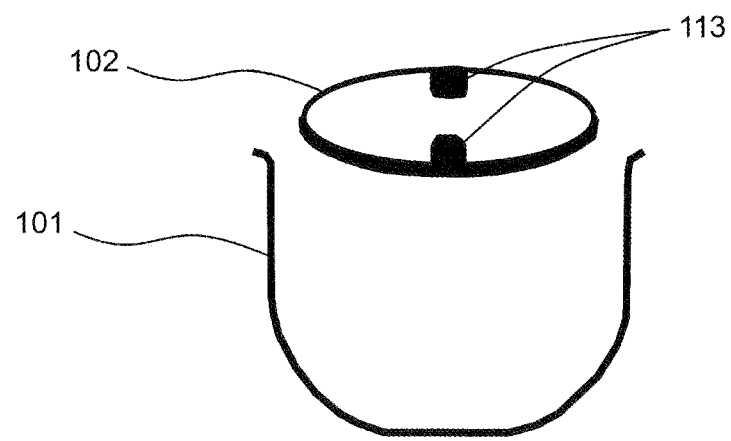
FIG. 13 is a view of another display by the interior-state display area.
Figure 14:
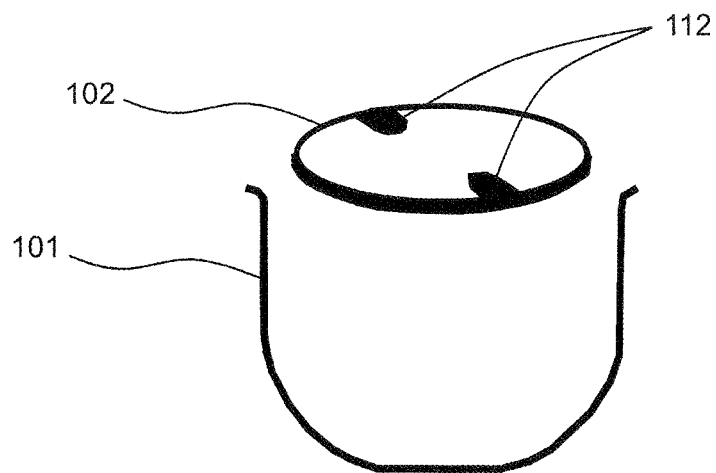
FIG. 14 is a view of another display by the interior-state display area.

FIG. 6 is a schematic top view of the rice cooker as viewed from above. Part of FIG. 6 is an enlarged view of the LCD part 5, where all of characters and pictures that can be displayed by the LCD part 5 are shown.

The LCD part 5 has a rice display area 5a, a boiling menu display area 5b, a cooking display area 5c, an interior-state display area 5d, and a time display area 5e. The rice display area 5a displays one of 'white rice,' 'no-wash rice,' 'brown rice,' 'sprouted brown rice,' and 'partly milled rice.' The boiling menu display area 5b displays one of 'normal,' 'solid,' 'soft,' 'quick,' 'gruel,' 'Chinese gruel,' 'Takikomi' (food-mixed boiled rice), 'Sushi rice,' 'small quant.,' 'eco-boiling,' and 'scorched rice.' Also, the cooking display area 5c displays one of 'boiling,' 'stewing,' 'steaming,' 'confection,' 'reserve 1,' and 'reserve 2.' Display contents of the rice display area 5a, the boiling menu display area 5b, and the cooking display area 5c are varied in response to operation of the operation buttons 6, 6, . . . . On the other hand, a display content of the interior-state display area 5d is varied in response to the state of the rotator 11 and the first, second stirrer arms 12A, 12B. Further, the display content of the time display area 5e is varied along with lapse of time or cooking process.

FIGS. 7 to 15 are views for explaining display examples of the interior-state display area 5d.

With the lid 2 closed, the interior-state display area 5d performs visual notification as to the rotator 11 and the first, second stirrer arms 12A, 12B. More specifically, if the first, second stirrer arms 12A, 12B are in the non-stirring state with the lid 2 closed, then the interior-state display area 5d displays the picture shown in FIG. 7. If the first, second stirrer arms 12A, 12B are in the stirring state with the lid 2 closed, then the interior-state display area 5d displays the picture shown in FIG. 8. Also, with the lid 2 closed, if the rotator 11 is rotated as the first, second stirrer arms 12A, 12B are in the stirring state, then the interior-state display area 5d displays the pictures shown in FIG. 8, FIG. 9, FIG. 10, FIG. 11, FIG. 8, FIG. 9, FIG. 10, FIG. 11, FIG. 8, . . . , sequentially. With the lid 2 closed, if the rotator 11 is rotated as the first, second stirrer arms 12A, 12B are in the non-stirring state, then the interior-state display area 5d displays the pictures shown in FIG. 7, FIG. 12, FIG. 13, FIG. 14, FIG. 7, FIG. 12, FIG. 13, FIG. 14, FIG. 7, . . . , sequentially.

It is noted that in the drawings of FIGS. 7 to 14, reference sign 101 denotes an inner-pot equivalent part, 102 denotes a rotator equivalent part, 111 to 114 denote upper stirrer arm equivalent parts, and 121 to 124 denote lower stirrer arm equivalent parts.

According to the rice cooker constituted as described above, if the first, second stirrer arms 12A, 12B are in the non-stirring state of FIG. 3, then the rotating shaft 15 is rotated forward (clockwise as viewed from the lid 2 side) by a driver 20 so that the first, second stirrer arms 12A, 12B can be pivoted so as to be in the stirring state of FIG. 4. Further, keeping the rotating shaft 15 continuously rotated forward allows the first, second stirrer arms 12A, 12B in the stirring state to be rotated integrally with the rotator 11. As a result, rice and water as an example in the inner pot 7 can be stirred by the first, second stirrer arms 12A, 12B.

On the other hand, if the first, second stirrer arms 12A, 12B are in the stirring state of FIG. 4, then the rotating shaft 15 is rotated reverse (counterclockwise as viewed from the lid 2 side) by the driver 20, so that the first, second stirrer arms 12A, 12B can be pivoted so as to be in the non-stirring state of FIGS. 2 and 3. As a result, opening/closing of the lid 2 can be prevented from being obstructed by the first, second stirrer arms 12A, 12B.

As described above, pivoting of the first, second stirrer arms 12A, 12B as well as rotating of the rotator 11 can be fulfilled by one drive motor 24.

Also, even with the lid 2 closed, it can be visually discriminated by the display of the interior-state display area 5d whether the first, second stirrer arms 12A, 12B are in the non-stirring state of FIGS. 2 and 3 or in the stirring state of FIG. 4. Therefore, it becomes possible to dissuade the user from opening the lid 2 while the first, second stirrer arms 12A, 12B are in the stirring state. As a result, it is possible to reduce the possibility that the first, second stirrer arms 12A, 12B may involve up the rice or the like in the inner pot 7 or the opening action of the lid 2 may be obstructed by the first, second stirrer arms 12A, 12B.

Further, it also becomes possible to prevent the possibility that during cooking of potatoes boiled with meat, jam or the like, the lid 2 may be opened so that the first, second stirrer arms 12A, 12B splash up the potatoes boiled with meat, jam or the like.

For cooking of a stew with the above rice cooker, there is a need for opening the lid 2 in the course of cooking to add milk on the way. In this case, since it can be discriminated, even without opening the lid 2, whether the first, second stirrer arms 12A, 12B are in the stirring state or in the non-stirring state, the user is enabled to accurately grasp a timing at which the lid 2 may freely be opened. Thus, the stew can be finished successfully.

Also, since the state of the first, second stirrer arms 12A, 12B is visually notified by the interior-state display area 5d, the user can securely discriminate the state of the first, second stirrer arms 12A, 12B even under noisy circumstances.

Also, while the rotator 11 is rotating, the interior-state display area 5d displays the pictures shown in FIG. 8, FIG. 9, FIG. 10, FIG. 11, FIG. 8, FIG. 9, FIG. 10, FIG. 11, FIG. 8, . . . , sequentially, or displays the pictures shown in FIG. 7, FIG. 12, FIG. 13, FIG. 14, FIG. 7, FIG. 12, FIG. 13, FIG. 14, FIG. 7, . . . , sequentially. Therefore, when opening the lid 2 may cause the rotator 11 or the like to be damaged, the user can be dissuaded from opening the lid 2.

In the above-described embodiment, the induction heating coil 10 is used as an example of the heating part. Alternatively, for example, a resistance-heating type heater may be used as an example of the heating part.

In the above embodiment, one end portion of each of the first, second stirrer arms 12A, 12B is pivotably attached to the rotator 11. However, it is also allowable that one end portion of only one of the first, second stirrer arms 12A, 12B is pivotably attached to the rotator 11. That is, in this invention, the number of stirrers may be other than two, e.g., one as an example.

In the above embodiment, notification as to the rotator 11 and the first, second stirrer arms 12A, 12B is visually performed by the LCD part 5. However, notification as to the rotator 11 and the first, second stirrer arms 12A, 12B may also be auditorily done by a loudspeaker, as an example. For example, it may be arranged that music is issued from a loudspeaker while the first, second stirrer arms 12A, 12B are in the stirring state.

In the above embodiment, the LCD part 5 has the interior-state display area 5d. Alternatively, the LCD part 5 may have an interior-state display area which displays the pictures shown in FIGS. 7 to 14 while the lock mechanism 9 is not locking the lid 2, and which displays the pictures shown in FIGS. 15 and 16 or the like while the lock mechanism 9 is locking the lid 2. Since whether or not the lock mechanism 9 is locking the lid 2 can be discriminated by this interior-state display area, it becomes possible to dissuade the user from opening the lid 2 when the lock mechanism 9 is not locking the lid 2 and moreover the first, second stirrer arms 12A, 12B are opened so as to be in the stirring state.

Figure 15:
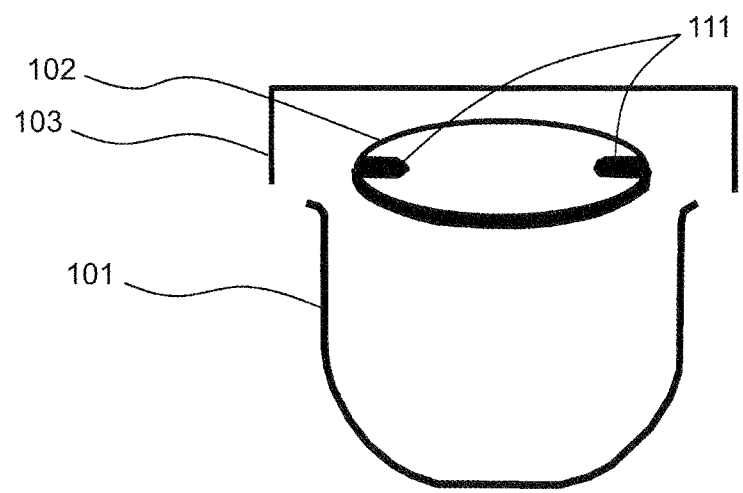
FIG. 15 is a view of another display by the interior-state display area.
Figure 16:
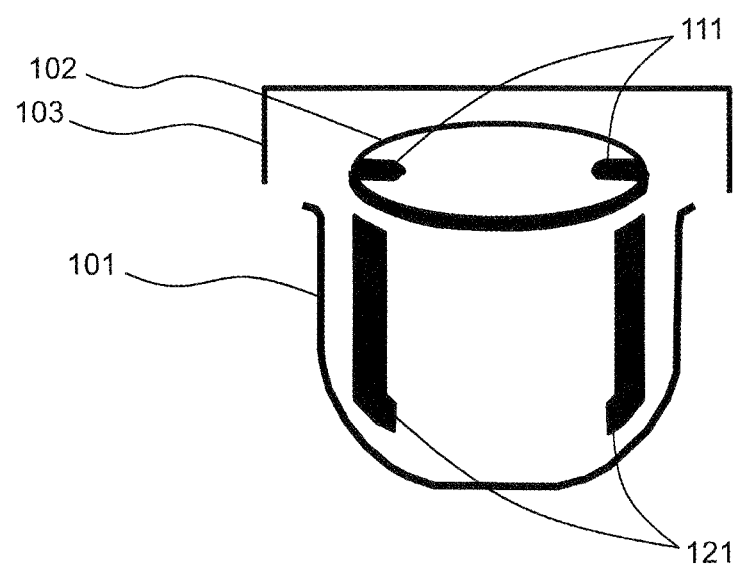
FIG. 16 is a view of a display by a modification of the interior-state display area.

In the drawings of FIGS. 15 and 16, reference sign 101 denotes an inner-pot equivalent part, 102 denotes a rotator equivalent part, 103 denotes a locked lid equivalent part, 111 denotes an upper stirrer arm equivalent part, and 121 denotes a lower stirrer arm equivalent part.

Instead of the LCD part 5 in the above embodiment, an LCD part 5 for displaying rice boiling steps associated with the stirring state and the non-stirring state may also be used. For example, an LCD part 105 shown in FIG. 17 may be provided on top of the lid 2.

The LCD part 105 has a rice display area 105a, a boiling menu display area 105b, a cooking display area 105c, an interior-state display area 105d, and a time display area 105e, as well as a boiling step display area 105f. In the course of rice boiling, the boiling step display area 105f displays one of 'rice washing,' 'preheating,' 'boiling,' and 'steaming.' In this case, the interior-state display area 105d displays the stirring state and the non-stirring state in association with a step displayed in the boiling step display area 105f.

Figure 17:
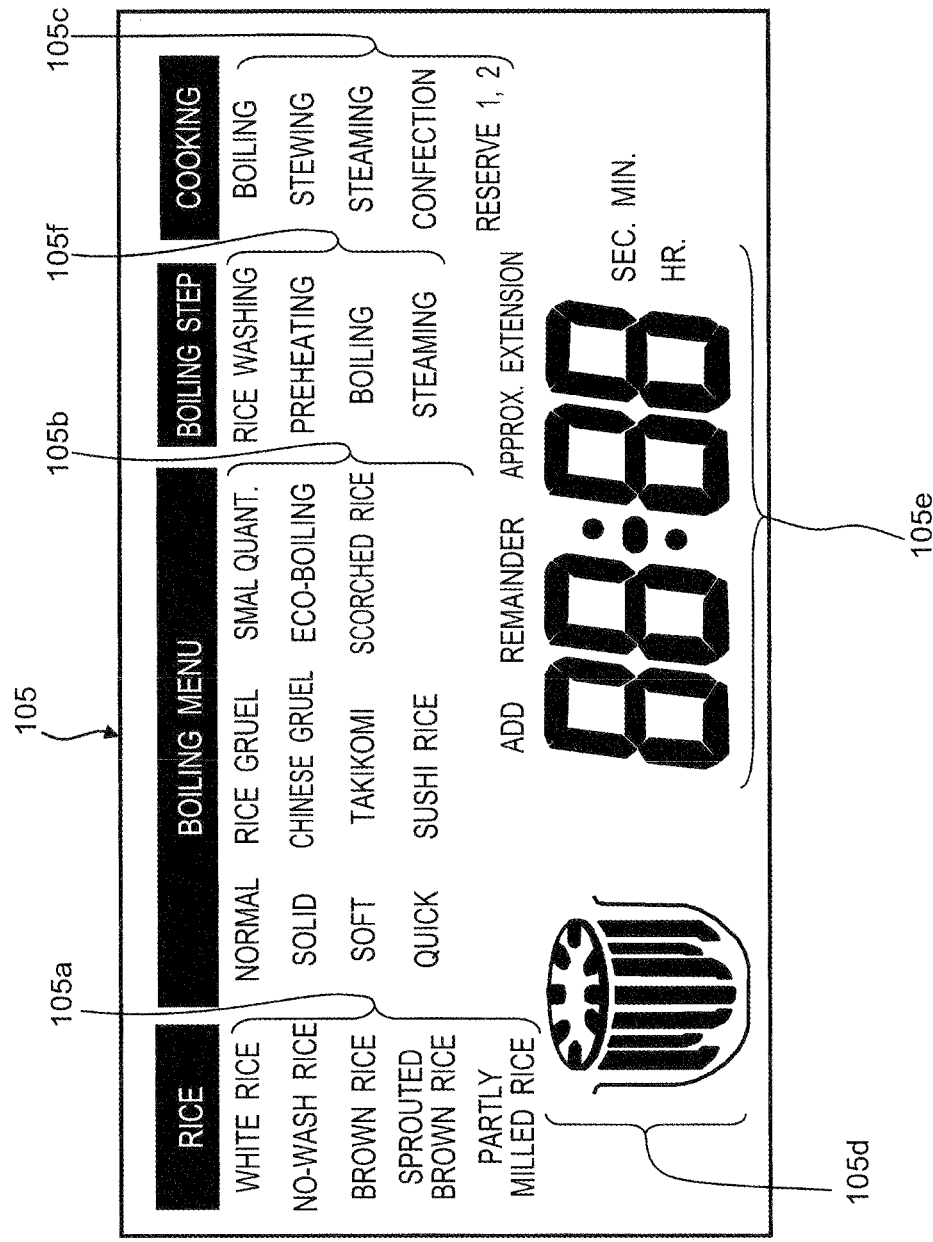
FIG. 17 is a view of a modification of an LCD part.

FIG. 17, as in FIG. 6, shows all of characters and pictures that can be displayed by the LCD part 105. Also, the rice display area 105a, the boiling menu display area 105b, the cooking display area 105c, the interior-state display area 105d, and the time display area 105e in FIG. 17 are similar to the rice display area 5a, the boiling menu display area 5b, the cooking display area 5c, the interior-state display area 5d, and the time display area 5e in FIG. 6, respectively, and therefore their description is omitted.

Instead of the LCD part 5 in the above embodiment, an LCD part having only the rice display area 105a, the boiling menu display area 105b, the interior-state display area 105d, the time display area 105e, and the boiling step display area 105f may also be used.

In the above embodiment, for example, a rotary encoder for detecting a rotating speed of the coupling shaft may be provided in the lid 2 so as to enable detection of a state of the rotator 11 based on an output of the rotary encoder.

In the above embodiment, for example, a limit switch to be turned on by the first, second stirrer arms 12A, 12B of the non-stirring state may be provided on the rotator 11 so as to enable detection of a state of the first, second stirrer arms 12A, 12B based on an output of the limit switch.

Although specific embodiments of the present invention have been described hereinabove, yet the invention is not limited to the above embodiments and may be carried out as they are changed and modified in various ways within the scope of the invention. For example, the above-described embodiment and the above-described modifications may be combined together in various ways as required to provide one embodiment of the invention.

REFERENCE SIGNS LIST 1 rice cooker body
2 lid
5 LCD part
9 lock mechanism
10 induction heating coil
11 rotator
12A first stirrer arm
12B second stirrer arm

The invention claimed is:

1. A heating cooker comprising:
an inner pot for accommodating therein a heating object to be heated;
a heating cooker body for accommodating the inner pot therein;
a heating part attached to the heating cooker body and serving for heating the heating object;
a lid which is operably/closably attached on top of the heating cooker body and which can be closed so as to cover the inner pot;
a rotator rotatably placed between the heating cooker body and the lid;
stirrers which are pivotably attached to the rotator and which can be pivoted without opening the lid between a) a stirring position in which the stirrers are in contact with the heating object set in the inner pot, and b) a non-stirring position in which the stirrers are apart from the heating object set in the inner pot; and
a notification part notifying by pictures as to whether the stirrers are in the stirring state or in the non-stirring state with the lid closed.

2. The heating cooker as claimed in claim 1, wherein
the notification part is a display part for visually performing notification as to the stirrers.

3. The heating cooker as claimed in claim 2, wherein
the display part displays rice boiling steps associated with the stirring state and the non-stirring state.

4. The heating cooker as claimed in claim 2, further comprising:
a lock mechanism for locking the lid, wherein
the display part displays whether or not the lock mechanism is locking the lid.

5. The heating cooker as claimed in claim 2, wherein
the display part displays a state in which the rotator is rotating.

6. The heating cooker as claimed in claim 3, further comprising:
a lock mechanism for locking the lid, wherein
the display part displays whether or not the lock mechanism is locking the lid.

7. The heating cooker as claimed claim 3, wherein
the display part displays a state in which the rotator is rotating.

8. The heating cooker as claimed claim 4, wherein
the display part displays a state in which the rotator is rotating.

9. The heating cooker as claimed in claim 1, wherein
the rotator is attached to and placed in the lid.

* * * * *